United States Patent

Wise et al.

[11] Patent Number: 6,010,619
[45] Date of Patent: Jan. 4, 2000

[54] FCC PROCESS WITH ZEOLITE AND HYDROTALCITE

[75] Inventors: Lowell G. Wise, McLean, Va.; Hartley Owen, Worton, Md.

[73] Assignee: Greenvue Company, LLC, MCLean, Va.

[21] Appl. No.: 09/010,198

[22] Filed: Jan. 21, 1998

Related U.S. Application Data

[60] Provisional application No. 60/035,671, Jan. 22, 1997.

[51] Int. Cl.[7] .............................. C10G 11/02; C10G 9/26; B01J 20/34

[52] U.S. Cl. ............................... 208/120.01; 208/120.25; 208/125; 208/126; 502/20; 502/516

[58] Field of Search ........................ 208/120.01, 120.25, 208/125, 126; 502/20, 516

[56] References Cited

U.S. PATENT DOCUMENTS

| | | | |
|---|---|---|---|
| 4,889,615 | 12/1989 | Chin et al. | 208/113 |
| 4,944,864 | 7/1990 | Kugler | 208/120 |
| 5,358,701 | 10/1994 | Pinnavaia et al. | 423/242.1 |
| 5,399,329 | 3/1995 | Shutz et al. | 423/415.1 |
| 5,518,540 | 5/1996 | Jones | 106/638 |

*Primary Examiner*—Walter D. Griffin
*Assistant Examiner*—In Suk Bullock
*Attorney, Agent, or Firm*—L. P. Hobbes

[57] ABSTRACT

Crystalline materials having increased mechanical strength and improved chemical properties are provided by incorporating carbonate by contact treatment with carbon dioxide ($CO_2$) to modify the alkaline earth oxide morphology. Alkaline earth-containing particulate solids are stabilized in the crystalline oxide structure, preferably with dense phase or supercritical $CO_2$. Typical industrial applications include particulate contact solids, catalysts, binders and monolithic structures.

13 Claims, No Drawings

FCC PROCESS WITH ZEOLITE AND HYDROTALCITE

This application claims priority from provisional application 60/038,671 filed Jan. 22, 1997.

FIELD OF THE INVENTION

The present invention relates to alkaline earth carbonate particulate materials, contact solids compositions, catalytic structures and processes therefore. In particular, preformed alkaline earth-containing solids, such as magnesium, calcium, strontium and/or barium oxide-based materials, are contacted with carbon dioxide under high partial pressure or supercritical phase conditions.

BACKGROUND OF THE INVENTION

The present invention relates to improved alkaline earth-containing structures, such as particulate catalysts, monoliths or contact solids. The alkaline earth metals are divalent Group IIA elements (IUPAC Periodic Table), including calcium, barium, magnesium, beryhium and strontium, and form stable oxides which are often present as hydrates and carbonates.

Various alkaline earth materials, such as oxides, hydroxides and/or carbonates of Group IIA metals, clays, natural or synthetic hydrotalcites ("HTC"), or layered double hydroxides, are useful as contact solids in numerous industrial processes. The layered alkaline earth oxide/hydroxide materials are of particular interest. Recent investigations of hydrotalcite-like materials have provided insight into the varied compositions and crystalline nature of HTC's layered structures. It is generally known that such materials can be synthesized in a platy crystalline form having alternating layers of charged metal oxides and anionic "gallery" layers. X-ray diffraction studies indicate that the d-spacing for natural and synthetic HTC is about 7.5–8.5 Angstroms (Å), depending on the anionic layer components. Substitution of a large variety of anionic species in the hydroxide 'gallery' has been shown by prior workers. For instance, borate, carbonate, nitrate, phosphate, sulfite/sulfate, and carboxylate anions are known gallery replacements for hydroxyls in the anionic layers. Pillaring of these layered HTC materials is also known.

Naturally occurring hydrotalcite has the formula: $Mg_6Al_2(CO_3)(OH)_{16} \cdot 4H_2O$, and occurs as a trigonal mineral. A structural description of the class of "brucite" crystals is found in the work of Pinnavaia et al (U.S. Pat. No 5,358,701, incorporated by reference). Briefly, the metal oxide layers consist essentially of divalent alkaline earth oxide units, such as magnesium oxide (MgO), configured structurally with octahedral hydroxy groups. A trivalent metal oxide, such as alumina, can be inserted into the brucite crystalline lattice in the octahedrally-coordinated metal oxide layer. In the case of natural hydrotalcite, a carbonate layer may be substituted therein.

In view of a limited supply of naturally-occurring hydrotalcite, various efforts have been made to achieve a reasonably economic alternative material in the form of synthetic 'Layered Double Hydroxides. Production of analogous layered crystalline materials has been fruitful and it may be expected that important new uses for the class of hydrotalcite-like crystalline solids will increase its industrial demand.

SUMMARY OF THE INVENTION

It has been discovered that incorporation of carbonate can be effected by treatment of various alkaline earth metal oxide/hydrate solids with carbon dioxide, preferably dense phase or supercritical carbon dioxide or high partial pressure $CO_2$. In one embodiment, hydrotalcite sheet crystalline material is provided having a brucite crystalline structure containing divalent and trivalent metal oxides comprising predominantly divalent calcium, barium, strontium and magnesium oxides. The trivalent oxide (eg- alumina) is usually present in the brucite structure in molar ratio of about 1.5:1 to 8:1 alkaline earth metal oxide:trivalent oxide. The HTC may be treated advantageously by carbonation at temperature greater than 30° C. and pressure greater than 7360 kPa. In a preferred catalyst embodiment preformed catalyst with binder is treated at about 31–120° C. in bulk with carbon dioxide to carbonate the preformed structure. Improved toughness, compression strength, crush and/or attrition resistance are achieved, along with chemical stability.

DETAILED DESCRIPTION OF THE INVENTION

In the following description, units are given as parts by weight and metric units unless otherwise indicated. Although primary emphasis is given to magnesia-alumina HTC, it is understood that the novel particle carbonation technology is applicable to other alkaline earth oxide/hydrate materials.

Preparation

A preferred method of manufacturing hydrotalcite-like materials having a sheet morphology is disclosed by Shutz et al in U.S. Pat. Nos. 5,399,329 and 5,507,980, incorporated herein by reference. These materials may be synthesized from an aqueous slurry of pseudoboehmite and alkaline earth compound (eg- magnesium, calcium, barium and/or strontium oxide) in the presence of C1–C6 lower monocarboxylic acid, such as acetic acid, or similar directing agents. The coprecipitated crystalline sheet materials have a very high breadth:thickness ratio, eg- 50:1 to 5000:1.

Other synthetic HTCs are disclosed in the following U.S. Patents, incorporated by reference: U.S. Pat. Nos. 3,879,523 and 4,351,814 (Miyata et al); U.S. Pat. Nos. 4,656,156; 4,904,457 and 5,348,725 (Misra); U.S. Pat. No. 5,246,899 (Bhattacharyya); U.S. Pat. No. 5,116,587 (Pinnavaia et al); U.S. Pat. No. 5,437,720 (Cox et al); U.S. Pat. No. 5,578,286 (Martin et al).

Contact Solids/Catalysis Process Applications

The hydrotalcite or other hydrated alkaline earth oxide crystalline composition may include a combination of inorganic oxides with an inorganic binder, an organic binder, or a mixtures of an inorganic and organic binder. Desirable inorganic oxides include a member selected from the group consisting of oxides or hydroxides of aluminum, calcium, cobalt, copper, iron, magnesium, molybdenum, silicon, titanium, vanadium, zinc, tungsten, strontium, nickel, manganese, zirconium, barium, members of the lanthanide series and mixtures thereof.

The HTC materials of Shutz et al (U.S. Pat. Nos. 5,399, 329 and 5,507,980, incorporated herein by reference) are characterized by very high broadness to thickness ratios in the 50:1 to 5000:1 range. These interesting materials have desirable mechanical and chemical properties, which will render them useful as a solids binders or as active chemical sites. Recent efforts in this aspect of layer propagation have identified certain anionic species which contribute to forming the large sheets of synthetic hydrotalcites. The mechanism whereby these lower alkanoic acid anions direct the important plate shape is not understood; however, large plate crystals having a maximum dimension of about 5 to 500 microns impart excellent mechanical properties.

Carbonation Methods

It is preferred to convert a major amount of hydroxyl groups in the hydrotalcite or other alkaline earth oxide hydrate material to the carbonate by treatment with carbon dioxide. As disclosed in U.S. Pat. No. 5,518,540 to Jones, incorporated herein by reference, hydrated alkaline earth oxides, such as calcareous cements, exposed to high-pressure $CO_2$ undergo changes in the chemical composition of the alkaline earth compounds and crystal morphology. Carbonation of alkaline earth oxide/hydrates can increase the weight of the solid composition as much as 15–35 wt% by addition of a carbonate moiety.

Preformed porous structures comprising cured alkaline earth metal cements, when treated with supercritical carbon dioxide for a few minutes or hours, have greatly improved strength and altered chemical properties.

Catalyst Preparation

Advantageously, the carbonated alkaline earth material is employed as a component of catalyst particle, with hydrotalcite employed as a binder in admixture with various catalytic materials, such as zeolite catalysts for shape selective reactions, Co—Mo hydrogenation, Pt hydrogenation or oxidation catalysts, etc. For some applications, the catalytically active sites may be synthesized in the crystalline lattice of the zeolite or hydrotalcite components. Spheroidal or extrudate shapes are well known configurations for such catalysts. The preformed catalyst mixture with binder is dried and treated in bulk with carbon dioxide according to this invention to carbonate the preformed structure. Improved toughness, compression strength, crush and/or attrition resistance are achieved, along with chemical stability.

In the present invention, the particulate solid catalyst compositions may be prepared in the form of a spheroidal particle of about 10 to 10,000 microns diameter. Various shaped catalyst products may be made by extrusion of the alkaline earth oxide binder admixed with other components. Cylindrical pellets, polylobal extrudates, Raschig rings and saddle shapes may be fabricated in a known manner. Zeolitic materials, both natural and synthetic, have been demonstrated to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material.

A typical preparation for making a zeolite catalyst having active Bronsted acid sites may include 1–40 wt% zeolite, 10–99 wt% calcined or uncalcined hydrotalcite ('HTC'), 0.5–10 wt% added alkaline earth oxide, dry basis. Post-forming carbonation of hydroxyl groups with carbon dioxide neutralizes the basic groups to permit acid catalysis reactions. Other shape selective catalyst materials may be substituted for the zeolite component, such as silico-alumino-phosphates (SAPOs).

Various metals may be employed in the composition for catalytic activity. For instance, Group VIIIA metals may be added to the compounded catalyst mixture in amount from about 0.1% to 10% or more. Catalytically active trivalent metals, such as iron, chromium or gallium, may be synthesized in a zeolite or hydrotalcite lattice. Shape-selective intermediate pore silico-gallates or the like have good aromatization properties.

The alkaline earth metals, including calcium, barium, magnesium, and strontium form stable oxides which are often present as hydrates and carbonates. Incorporation of carbonate can be effected by treatment of various alkaline earth metal oxide solids with supercritical carbon dioxide. Hydrated alkaline earth oxide crystalline solid compositions may include a combination of inorganic oxides with a numerous other solid materials.

As disclosed in U.S. Pat. No. 5,518,540 to Jones, incorporated herein by reference, calcareous cement materials exposed to high-pressure $CO_2$ undergo changes in the chemical composition of the alkaline earth compounds and crystal morphology. Preformed porous structures comprising cured cements, when treated with supercritical carbon dioxide for a few minutes or hours, have greatly improved strength and altered chemical properties.

In one embodiment of the invention the supercritical carbon dioxide (but not dense-phase $CO_2$), in addition to reacting with the hydroxides in the alkaline earth material, can act as a transport medium or solvent to carry other alkaline earth modifiers, such as barium monohydrate, dissolved or suspended matter into a hardened calcium-containing matrix. In this embodiment, the carbonation reaction occurs as above described, but it is part of a larger chemical and physical process wherein barium enters the calcareous crystalline structure and provides a hard, dense, attrition-resistant matrix. As a result, the alkaline earth material matrix is rendered less permeable.

The barium additive may be impregnated into a raw, uncarbonated calcium cement-containing structure or may be used as a post-carbonation treatment. It may be desirable to impregnate the porous, preformed article with an aqueous solution of barium monohydrate prior to carbonation of both alkaline earth species.

Various siliceous catalyst materials may be employed in their acid form, ion-exchanged or impregnated with one or more suitable metals, such as Ga, Pd, Zn, Ni, Co and/or other metals of Periodic Groups IIIA to VIIIA and IB to IIB (IUPAC).

The present composition can also be used as a catalyst by intimate combination with a hydrogenating component such as tungsten, vanadium, molybdenum, rhenium, nickel, cobalt, chromium, manganese, or a noble metal such as platinum or palladium or mixtures thereof where a hydrogenation-dehydrogenation function is to be performed. Such component can be in the composition by way of co-crystallization, ion-exchanged into the composition to the extent a Group IIIB element, e.g. aluminum, is in the structure, impregnated therein or intimately physically admixed therewith. Such component can be impregnated in or on to it such as, for example, by, in the case of platinum, treating the matrix with a solution containing a platinum metal-containing ion. Thus, suitable platinum compounds for this purpose include chloroplatinic acid, platinous chloride and various compounds containing the platinum amine complex.

Batchwise processing can be employed for curing and post-treatment of bulk contact solids or monoliths. Autoclave equipment provides a convenient and safe means for heating and/or pressurizing the alkaline earth oxide/hydrate materials to remove excess free water in a drying cycle or to remove atmospheric gases by vacuum, thereby assuring high concentration of carbon dioxide during the carbonation step. Impregnation with added alkaline earth or other materials can also be achieved in an autoclave. Carbonation is performed by introducing dense phase or supercritical $CO_2$ to the autoclave, either with additional thermal treatment or adiabadically.

Continuous production may be achieved with multi-stage pumps by spray drying an aqueous slurry of newlysynthsized or rehydrated HTC, for instance. Various fluids, including dispersed additives, binders and/or catalytic components, may be added with the high pressure mixture, optionally along with high pressure supercritical or dense phase carbon dioxide. The number of unit operations may be minimized by selection of compatible materials and processing conditions. Alternatively, high pressure extrusion screw equipment may be used, wherein a fluent admixture of binder and solid catalyst components is fed to an extrusion screw and conveyed into a high pressure extrusion zone where the carbonation agent is injected under pressure.

The preferred hydrotalcite materials are non-toxic and prepared from safe and available starting materials. HTC has been reported by Kamura et al to be an effective gastic antacid (U.S. Pat. No. 3,539,306). Processes of manufacture are environmentally acceptable using standard industrial practices.

Contact Solids Preparation and Process Applications

Contact solids, such as sorbents and catalysts, employing alkaline earth materials are known to the chemical processing industries. Various particle preparations and methods of use are disclosed in the following U.S. Patents, incorporated by reference:

U.S. Pat. No. 5,182,242 (Marler et al);

U.S. Pat. No. 5,232,627 (Burba et al), clay adducts or HTC for viscosity;

U.S. Pat. No. 5,340,466 (Dai et al), hydrodesulfurization of naphtha;

U.S. Pat. No. 5,348,725 (Misra et al), ;pillared HTC catalysts;

U.S. Pat. No. 5,354,932 (Bhattacharyya), hydrocarbon conversion by HTC;

U.S. Pat. No. 5,360,547 (Cockett et al), liquid sorption with HTC;

U.S. Pat. No. 5,364,828 (Cox et al), HTC paint additive.

Other process applications and alkaline earth oxide catalyst methods are disclosed in the following U.S. Patents, incorporated by reference:

U.S. Pat. No. 4,410,454 (Faschingbauer)—oxidization catalyst w/Pt;

U.S. Pat. No. 4,472,532 (Niiu)—spinel containing solid for SOx removal;

U.S. Pat. No. 4,476,245 (Siefert) ";

U.S. Pat. No. 4,525,472 (Morales et al)—hydrodemetallation

U.S. Pat. No. 4,742,038 (Matsumoto)—catalyst monolith;

U.S. Pat. No. 4,851,381 (Hums)—NOx redctn w/vanadium oxide+MgO;

U.S. Pat. No. 4,870,044 (Kukes)—hydrotreating w/MgO-impreg. alumina;

U.S. Pat. No. 4,959,339 (Arai)—Pt/alkaline earth (Ba,Ca) catalyst;

U.S. Pat. No. 5,024,984 (Kaminsky et al)—oxidative coupling/Grp.IIA;

U.S. Pat. No. 5,037,792 (Luck)—alumina+spinel/NOx reduction;

U.S. Pat. No. 5,108,979 (Demmel et al)—spinel catalysts;

U.S. Pat. No. 5,128,305 (Yoshimoto et al)—NOx reduction w/alk.met cat.;

U.S. Pat. No. 5,134,108 (Thakur et al)—hydrogenation/ Cu+alk.met

This invention provides improved characteristics of alkaline earth material by subjecting it to dense-phase gaseous (very high pressure or partial pressure) or supercritical carbon dioxide ($CO_2$) to alter the morphology and/or chemistry of hardened, cured or preformed product and permit manipulation of its properties and behavior.

It has been found that morphological changes in carbonation of alkaline earth materials in calcareous cement products include micro-crystals of calcite in what prior to carbonation was calcium-silicate-hydrate gel. Altered micromorphology include significant crystalline changes when dense-phase or supercritical carbon dioxide is infused into a porous structure containing hydrated alkaline earth oxide materials. Densified microstructure with various types of crystals may result, generally exhibiting fewer micropores and microcapillaries than is typical of alkaline earth materials carbonated by slow atmospheric sorption or by means of relatively low-pressure gaseous $CO_2$. Flat, plate-like structures and/or fine, needle-like crystals are often converted by high pressure carbonation.

Supercritical or dense phase $CO_2$ can act as a polar solvent, and can be used to infuse the preformed, hardened alkaline earth material matrix concurrently with carbonation with materials dissolved or suspended in the $CO_2$ to alter the properties and behavior of the hardened alkaline earth material.

$CO_2$ becomes supercritical when it reaches a temperature of at least 31° C. and a pressure of at least about 73 atmospheres (7360 Kpa or 1071 psi). Dense-phase $CO_2$ is somewhat different than the supercritical phase and does not behave like a both liquid and a gas. Dense-phase $CO_2$ is highly compressed gas (eg- 80+atmo.) which has a temperature less than 31° C. so that it does not have the characteristics typical of supercritical $CO_2$.

Alkaline earth material carbonates can interact with non-alkaline materials, such as fillers, clays or reinforcing materials or blends of materials by bonding the crystalline lattice of the alkaline earth material to form structurally improved, reinforced mixtures. Alkaline earth material which has been carbonated shows reduced pH. The supercritical $CO_2$ infusion causes the hydroxides in the alkaline earth material to convert to neutral carbonates. It also alters the physical micro-structure of the material.

STRONTIUM HYDROTALCITE CONTACT SOLIDS

Preparation of Sr-HTC

A direct synthesis method of manufacturing hydrotalcite-like materials having a sheet morphology employs an aqueous slurry of pseudoboehmite and alkaline earth compounds (eg- magnesium and strontium oxide) in the presence of C1–C6 lower monocarboxylic acid, such as acetic acid, or similar directing agents. The coprecipitated crystalline sheet materials have a very high breadth:thickness ratio.

The following proportions are given in parts by weight. Pseudoboemite alumina (30 parts) is dispersed with 27 parts acetic acid in 1000 parts deionized water and heated with vigorous agitation to about 60° C. Calcined MgO (8 parts) is intimately mixed with calcined SrO (27 parts) and added slowly to the alumina dispersion with agitation and heated to 80–95° C. for about 8–12 hours. The resulting double hydroxide form of Sr-HTC is spray dried to form spheroidal particles in the size range of about 150–250 microns. The recovered particles are treated with carbon dioxide at about 1000 psi and 35+° C. to convert hydroxyl groups to carbonate ion in the gallery.

The alkakine earth metal oxides a octahedrally coordinated in a brucite crystal. X-ray spectroscopy confirms the Mg/Sr-HTC structure having d-spacing greater than 7.5 Å.

Hydrothermal Synthesis

Strontitum-substituted hydrotalcite can be made by treating a conventional magnesium aluminate HTC material under hydrothermal conditions in the presense of a source of strontium ions. For example, commercially available Alcoa HTC in precarbonated form is slurried in an aqueous solution containing in equal weight of strontium salt (SrCl2:HTC=1:1) and heated at about 60° C. for sufficient time to effect migration of Sr ion into the brucite lattice, replacing a portion of the octahegdrally coordinated magnesium. Usually 0.1 to 20 hours suffices to exchange Sr for Mg atoms with greater than 50% approach to equilibrium. X-ray diffraction studies confirm the Sr/Mg-HTC structure, and the presence of carbonate and oxide moieties is demonstrated. A suitable contact particle can be recovered by rinsing the filtered slurry and/or and spray drying the crystal slurry to obtain a particle size in the desired range (eg, 100–250$\mu$).

Metal Trapping Agents for Heavy Oil Processing

Carbonated strontium-containing materials, especially those having a hydrotalcite structure can be employed in removing vanadium and/or nickel from heavy petroleum feedstocks during refining. In U.S. Pat. No. 4,944,864 (Kugler) FCC unit operations employing strontium carbonate in combination with convention zeolite catalytic materials reacts with and traps the metal poison to preserve the structure of the zeolite.

In a typical hydrothermal synthesis, alkaline earth oxides, eg 60–100 mol % SrO and 0–40 mol % MgO (or CaO/BaO) react with the alumina to form platy hydrotalcite in the hydroxyl form in aqueous slurry. These Sr-modified crystals have hydroxyl units in the gallery anion position and can be readily carbonated, as described herein. A suitable contact particle can be recovered by spray drying the crystal slurry with particle size in the desired range.

If admixed with conventional USY or REY zeolite FCC catalyst particles in the 10–200 micron range (preferably 40–80$\mu$ average size), effective metal trapping can be achieved in a conventional FCC unit operation. Results are similar to those of Kugler, with significant operating advantages.

In one embodiment of the invention, a stratified fluidized bed of catalyst materials is maintained by differential density. Preferably the contact particles have a size in the range of 100 to 250 microns and a loose bulk density of about 250–500 kg/m$^3$. Relatively light Sr-hydrotalcite (having a density of about 0.2–0.4) can be made to float above typical zeolite catalysts (having a density of about 0.7) in a fixed fluidized bed contact zone and separated by increased density of Sr-hydrotalcite due to mass of the trapped metal. The stratification of a fixed fluidized bed is an advantageous technique for operating the FCCU. It is understood by those skilled in FCCU operation that particles having differences in density or particle size can be segregated, at least partially, thus providing a mechanism for removing trapped metals from the inventory of circulating catalyst.

In another embodiment of the invention, a conventional FCCU is modified to recover a lower purge stream rich in metal-laden Sr-HTC additive. Relatively large particle size (eg, 150–200$\mu$) Sr-HTC is employed with Y zeolite cracking catalyst in the Y:Sr-HTC ratio of about 5:1 to 100:1 (preferably 10:1 to 20:1). The catalytic mixture is separated from FCC product hydrocarbons and passed to a stripping zone for contact with steam to recover volatile sorbed hydrocarbons in a fixed fluidized stripping bed. Relatively low density Sr-HTC particles can be stratified and concentrated relative to higher density Y zeolite particles. As metals accumulate on the Sr-HTC particles, increased density will cause these metal-laden particles to be concentrated in a lower stratum, from which the demetalization additive can be purged from the FCCU. Fresh Sr-HTC can be added incrementally to the FCCU or along with fresh or regenerated Y zeolite particles.

Sr-HTC additive having Ni/V metal deposited thereon may be circulated along with coked zeolites to the regenerator unit, where oxidation of coke to carbon oxides is promoted by deposited metal.

What is claimed is:

1. In the process for converting hydrocarbon feed stock oil by fluid catalytic cracking at elevated temperature with zeolite cracking catalyst particles wherein the hydrocarbon oil contains heavy metal compounds; the improvement which comprises:

contacting metal-laden zeolite particles with particulate hydrotalcite-demetallization contact solids, said contact solids comprising carbonated hydrotalcite having a brucite crystalline structure of divalent Group IIB and trivalent Group IIIB metal oxides containing octahedrally coordinated strontium, wherein at least one trivalent metal oxide is present in the brucite structure in molar ratio of divalent Group IIB:trivalent metal Group IIIB from 3:1 to 8:1; whereby heavy metal is trapped by the hydrotalcite contact solids.

2. The process of claim 1 wherein strontium oxide and aluminum oxide are present in the brucite structure in molar ratio from 3:1 to 8:1; and wherein the hydrotalcite contains gallery carbonate anion.

3. The process of claim 2 wherein the Group IIB metal oxides consist essentially of magnesium and strontium in a molar ratio between 10:1 and 1:10.

4. The process of claim 1 wherein the hydrotalcite contact solids have a particle size in the range of 100 to 250 microns and a loose bulk density of about 250–500 kg/m$^3$.

5. The process of claim 2 wherein the Group IIB metal oxide consists essentially of strontium.

6. The process of claim 2 wherein a stratified fluidized bed of catalyst materials is maintained by differential density of zeolite and hydrotalcite particles.

7. The process of claim 2 wherein contact solids mixture of zeolite and hydrotalcite is separated from cracking product hydrocarbons and passed to a stripping zone to recover volatile sorbed hydrocarbons in a fixed fluidized stripping bed.

8. The process of claim 7 wherein relatively low density hydrotalcite particles are stratified and concentrated relative to higher density zeolite particles.

9. The process of claim 7 wherein stratified hydrotalcite particle essentially float above zeolite catalysts in a fixed fluidized bed contact zone and are separated by increased density of hydrotalcite due to accumulated mass of trapped metal.

10. The process of claim 2 wherein hydrotalcite and zeolite particles having differences in density or particle size are segregated within a fluidization zone, and wherein trapped metals are removed from inventory of circulating catalyst.

11. The process of claim 10 wherein hydrotalcite contact solids having a particle size in the range of 100 to 250 microns and a loose bulk density of about 250–500 kg/m$^3$ are contacted with USY or REY zeolite FCC catalyst particles in the 10–200 micron range.

12. An improved process for converting hydrocarbon feed stock oil by fluid catalytic cracking at elevated temperature with zeolite cracking catalyst particles wherein the hydrocarbon oil contains heavy metal compounds, comprising:

contacting metal-laden zeolite particles with particulate hydrotalcite demetallization contact solids, said contact solids comprising hydrotalcite having a brucite crystalline structure of divalent Group IIB and trivalent Group IIIB metal oxides containing octahedrally coordinated strontium, wherein at least one trivalent metal oxide is present in the brucite structure in molar ratio of divalent Group IIB:trivalent metal Group IIIB from 3:1 to 8:1;

trapping heavy metal with the hydrotalcite contact solids having a particle size in the range of about 150 to 200 $\mu$, while maintaining a contact solids mixture of zeolite cracking catalyst to hydrotalcite solids in a weight ratio of about 5:1 to 20:1; separating the contact solids mixture from cracking product hydrocarbons; and passing separated solids to a stripping zone for contact with steam to recover volatile sorbed hydrocarbons in a fixed fluidized stripping bed.

13. The process of claim 12 wherein relatively low density hydrotalcite particles are stratified and concentrated relative to higher density zeolite particles while metals accumulate on the hydrotalcite particles, whereby increased density causes metal-laden hydrotalcite particles to be concentrated in a lower stratum for purging from the process.

* * * * *